(12) United States Patent
Ohara

(10) Patent No.: US 11,463,990 B2
(45) Date of Patent: Oct. 4, 2022

(54) USER EQUIPMENT AND PREAMBLE TRANSMISSION METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 156 days.

(21) Appl. No.: 16/960,396

(22) PCT Filed: Jan. 11, 2018

(86) PCT No.: PCT/JP2018/000544
§ 371 (c)(1),
(2) Date: Jul. 7, 2020

(87) PCT Pub. No.: WO2019/138522
PCT Pub. Date: Jul. 18, 2019

(65) Prior Publication Data
US 2020/0359358 A1 Nov. 12, 2020

(51) Int. Cl.
H04W 4/00 (2018.01)
H04W 72/02 (2009.01)
(Continued)

(52) U.S. Cl.
CPC ......... H04W 72/02 (2013.01); H04W 56/001 (2013.01); H04W 72/005 (2013.01); H04W 72/1263 (2013.01)

(58) Field of Classification Search
CPC . H04W 74/0833; H04W 56/00; H04W 72/04; H04W 72/12; H04W 72/1263;
(Continued)

(56) References Cited

U.S. PATENT DOCUMENTS

2011/0305197 A1* 12/2011 Park ............... H04W 72/04
370/328
2016/0165640 A1* 6/2016 Yang ............... H04W 74/0833
370/336
(Continued)

FOREIGN PATENT DOCUMENTS

WO 2017/133010 A1 8/2017

OTHER PUBLICATIONS

International Search Report issued in PCT/JP2018/000544 dated Mar. 13, 2018 (5 pages).
(Continued)

Primary Examiner — Shantell L Heiber
(74) Attorney, Agent, or Firm — Osha Bergman Watanabe & Burton LLP

(57) ABSTRACT

In one aspect of the present invention, user equipment includes a reception unit configured to detect a synchronization signal or a physical broadcast channel from a base station; a resource selection unit configured to select, from resources determined based on configuration information for preamble transmission, a resource for transmitting a preamble according to the detected synchronization signal or the detected physical broadcast channel based on a mapping rule, with a period determined based on at least one of a period of a synchronization signal burst set that is a duration during which the synchronization signal or the physical broadcast channel can be transmitted and a period of a resource available for transmission of the preamble; and a transmission unit configured to transmit the preamble to the base station on the selected resource.

14 Claims, 9 Drawing Sheets

(51) Int. Cl.
*H04W 56/00* (2009.01)
*H04W 72/00* (2009.01)
*H04W 72/12* (2009.01)

(58) Field of Classification Search
CPC . H04W 72/005; H04W 72/02; H04W 72/044; H04J 2203/0069
See application file for complete search history.

(56) References Cited

U.S. PATENT DOCUMENTS

2017/0325205 A1* 11/2017 Zhou ............... H04W 72/042
2018/0343091 A1 11/2018 Xia

OTHER PUBLICATIONS

Written Opinion of the International Searching Authority issued in PCT/JP2018/000544 dated Mar. 13, 2018 (4 pages).
Ericsson; "NR four-step random access procedure"; 3GPP TSG-RAN WG1 NR adhoc, R1-1700299; Spokane, USA; Jan. 16-20, 2017 (7 pages).
ZTE; "Discussion on cell identification in NR"; 3GPP TSG-RAN WG4 Meeting #83, R4-1705178; Hangzhou, China; May 15-19, 2017 (6 pages).
3GPP TS 36.211 V14.2.0; "3rd Generation Partnership Project; Technical Specification Group Radio Access Network Evolved Universal Terrestrial Radio Access (E-UTRA); Physical channels and modulation (Release 14)"; Mar. 2017 (194 pages).
Office Action issued in the counterpart Indian Patent Application No. 202037033250, dated Sep. 10, 2021 (7 pages).
Ericsson; "NR PRACH design"; 3GPP TSG-RAN WG1 NR adhoc, R1-1700298; Spokane, USA; Jan. 16-20, 2017 (22 pages).
Extended European Search Report issued in counterpart European Patent Application No. 18899592.2, dated Aug. 5, 2021 (11 pages).
Office Action issued in the counterpart Japanese Patent Application No. 2019-564226, dated Nov. 9, 2021 (5 pages).
Qualcomm Incorporated; "Remaining Details on RACH Procedure"; 3GPP TSG-RAN WG1 Meeting #91, R1-1720653; Reno, Nevada, USA; Nov. 27-Dec. 2, 2017 (22 pages).
LG Electronics; "RACH procedure"; 3GPP TSG RAN WG1 Meeting #91, R1-1719898; Reno, USA; Nov. 27-Dec. 1, 2017 (11 pages).

* cited by examiner

USER EQUIPMENT AND PREAMBLE TRANSMISSION METHOD

TECHNICAL FIELD

The present invention relates to user equipment and a preamble transmission method.

BACKGROUND ART

In Third Generation Partnership Project (3GPP), communication standards (5G or NR) as a next generation of Long Term Evolution (LTE) and LTE-Advanced have been discussed. In an NR system, as in LTE and the like, it is expected that random access will be performed in the case where user equipment (UE) establishes a connection or a re-connection with a base station (eNB or eNodeB).

A channel for transmitting a preamble initially in LTE random access is referred to as a physical random access channel (PRACH). Configuration information (RACH Configuration) regarding the PRACH is provided by the base station to the user equipment using an index. In other words, the user equipment selects a resource (hereinafter referred to as a RACH resource) of the PRACH based on the RACH Configuration provided by the base station (see Non-Patent Document 1).

PRIOR-ART DOCUMENTS

Non-Patent Documents

[Non-Patent Document 1] 3GPP TS36.211 V14.2.0 (2017-03)

DISCLOSURE OF INVENTION

Problem(s) to be Solved by the Invention

In NR, as in LTE and the like, it is expected that user equipment will select one or more RACH resources based on a RACH Configuration provided by a base station. In NR, it is considered that a primary synchronization signal (PSS), a secondary synchronization signal (SSS), and a physical broadcast channel (PBCH) can be repeatedly transmitted in a time direction. A resource in which the PSS, the SSS, and the PBCH are placed is referred to as a synchronization signal (SS) block. A series of repeatedly-arranged SS blocks is referred to as an SS burst set. It is expected that when the user equipment can detect an SS block, the user equipment will select one or more RACH resources from a plurality of resources which are determined based on the RACH Configuration.

However, since the number of RACH resources required to transmit a preamble according to an SS block in an SS burst set depends on the number of SS blocks in the SS burst set or the like, the number of RACH resources does not necessarily match the number of RACH resources which are determined based on the RACH Configuration.

It is an object of the present invention to provide a solution to appropriately determine a period for selecting one or more RACH resources according to an SS block in an SS burst set.

Means for Solving the Problem(s)

In one aspect of the present invention, there is provision for user equipment including:

a reception unit configured to detect a synchronization signal or a physical broadcast channel from a base station;

a resource selection unit configured to select, from resources determined based on configuration information for preamble transmission, a resource for transmitting a preamble according to the detected synchronization signal or the detected physical broadcast channel based on a mapping rule, with a period determined based on at least one of a period of a synchronization signal burst set that is a duration during which the synchronization signal or the physical broadcast channel can be transmitted and a period of a resource available for transmission of the preamble; and a transmission unit configured to transmit the preamble to the base station on the selected resource.

Advantageous Effect of the Invention

According to the present invention it is possible to appropriately determine a period for selecting one or more RACH resources according to an SS block in an SS burst set.

DETAILED DESCRIPTION OF THE PREFERRED EMBODIMENTS

In the following, embodiments will be described with reference to the drawings. Note that the embodiments described below are merely examples, and an embodiment to which the present invention can be applied is not necessarily to be limited to the following embodiments.

In the embodiments, terms defined in LTE are used for description as needed. Also, it is possible to use the existing technologies defined in LTE as needed for operation of a radio communication system. However, the existing technologies are not limited to those in LTE. Also, unless otherwise specified, the term "LTE" in the present specification is used in a broader sense covering LTE-Advanced or later. Although the embodiments will be described with respect to preamble transmission during random access, the present invention can be also applied to preamble transmission at any timing after synchronization with a base station.

In the embodiments, although the existing terms used in LTE, such as a PSS, an SSS, a PBCH, a RACH, and a preamble, are used for convenience of explanation, signals and so on represented by these terms may be differently termed.

<Overview of Radio Communication System>

Figure 1:
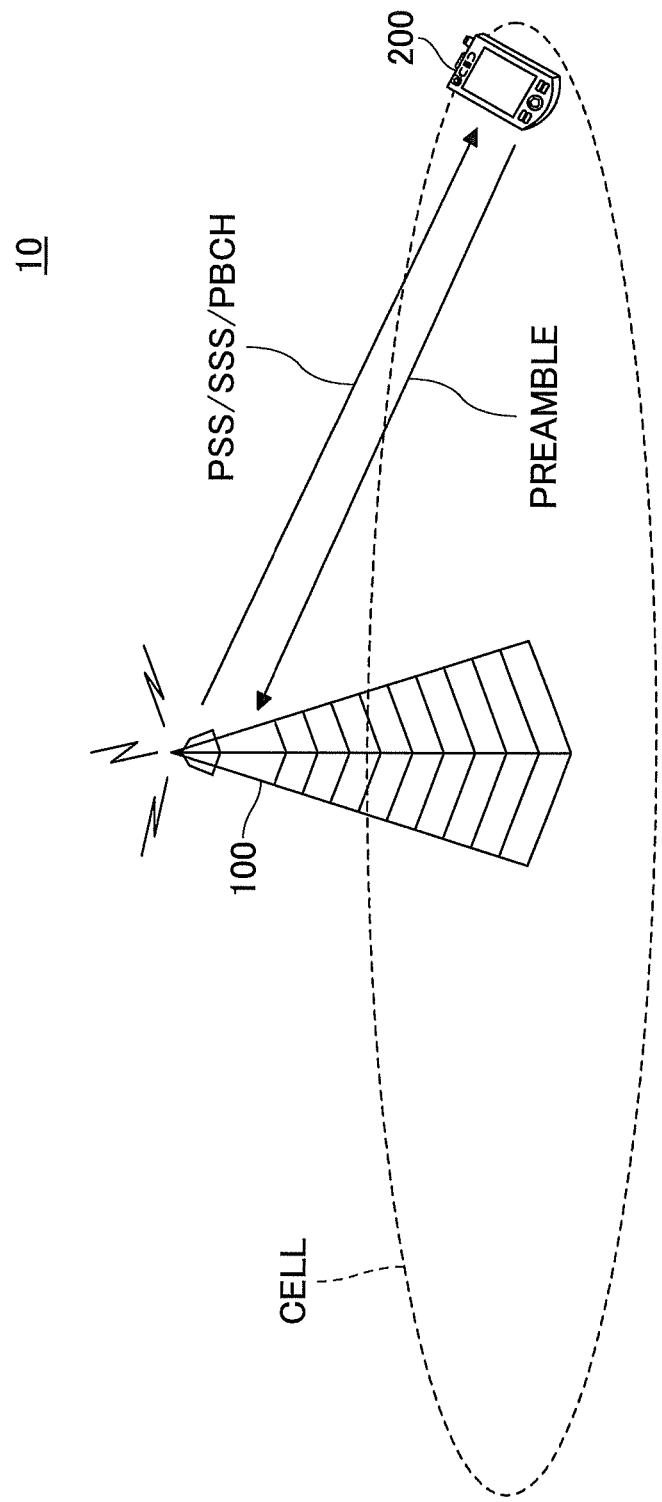
FIG. 1 is a schematic diagram of a radio communication system according to an embodiment of the present invention.

FIG. 1 is a configuration diagram of a radio communication system 10 according to an embodiment of the present invention. As shown in FIG. 1, the radio communication system 10 according to this embodiment includes a base station 100 and user equipment 200. While one base station 100 and one unit of user equipment 200 are illustrated in FIG. 1, a plurality of base stations 100 or plural units of user equipment 200 may be included. The base station 100 may be referred to as "BS" and the user equipment 200 may be referred to as "UE".

The base station 100 can accommodate one or more (for example, three) cells (also referred to as "sectors"). When the base station 100 accommodates a plurality of cells, the entire coverage area of the base station 100 can be divided into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB", "cell", and "sector" can be used interchangeably in this specification. In some cases, the base station 100 is also referred to as a fixed station, a NodeB, an eNodeB (eNB), an access point, a femto cell, a small cell, or the like.

In some cases, the user equipment 200 is referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

The base station 100 or the user equipment 200 can use beamforming with a narrow beam width to compensate for propagation loss in a high frequency band. To transmit a signal using beamforming, the base station 100 or the user equipment 200 determines a direction of a transmission beam (Tx-beam) using beam sweeping or the like, so that quality of a received signal on the other end is high. Similarly, to receive a signal using beamforming, the base station 100 or the user equipment 200 determines a direction of a reception beam (Rx-beam), so that quality of a signal transmitted from the other end is high.

For example, when the user equipment 200 establishes a connection to the base station 100 or re-synchronizes with the base station 100 for originating a call, for handover, or the like, random access is performed. In random access, the user equipment 200 transmits a preamble (PRACH preamble) which is selected from a plurality of preambles prepared in the cell. When the base station 100 detects the preamble, the base station 100 transmits a RACH response (RAR) that is a response to the preamble. When the user equipment 200 receives the RAR, the user equipment 200 transmits an RRC Connection Request as a message 3. After receiving the message 3, the base station 100 transmits an RRC Connection Setup as a message 4 including cell configuration information or the like for establishing a connection. When the user equipment 200 determines that its own UE ID is included in the message 4, the user equipment 200 completes the random access procedure and establishes a connection.

A channel for transmitting a preamble initially in random access is referred to as a physical random access channel (PRACH). Candidates for configuration information (RACH Configuration) with respect to the PRACH are defined in advance in a table referred to as a RACH Configuration Table, for example, in which an index is assigned to each RACH Configuration. The base station 100 provides an index in the RACH Configuration Table to the user equipment 200 via broadcast information or the like, so as to indicate locations, the number, a density, or the like of resources available for transmission of the preamble. The user equipment 200 can determine resources (i.e., RACH resources) available for transmission of the preamble based on the provided index (i.e., based on a RACH Configuration corresponding to the provided index). For example, the RACH resources are periodically arranged in a predetermined portion of resources in a time domain and a frequency domain. The RACH Configuration may be referred to as configuration information for preamble transmission.

The base station 100 can transmit a PSS, an SSS, or a PBCH using a plurality of SS blocks in an SS burst set by changing a direction of a transmission beam, for example. The SS burst set is repeatedly arranged in a period of 20 ms or the like, for example. The maximum number L of SS blocks in the SS burst set depends on a frequency band. For example, L is equal to 4 in 3 GHz or lower, L is equal to 8 in 3-6 GHz, and L is equal to 64 in 6-52.6 GHz. All the L SS blocks may not be necessarily used, but the base station 100 can use any number of SS blocks within the L SS blocks, which are SS blocks actually transmitted from the base station 100.

When the user equipment 200 detects the PSS, the SSS, or the PBCH, the user equipment 200 selects, from the resources available for transmission of the preamble, a RACH resource associated with the SS block in which the detected PSS, the detected SSS, or the detected PBCH is placed. The user equipment 200 transmits a preamble on the selected RACH resource. By using a correspondence between an SS block and a RACH resource, the base station 100 can identify which of the SS blocks in the SS burst set can be detected by the user equipment 200. The correspondence between the SS block and the RACH resource will be described with reference to FIG. 2.

Figure 2:
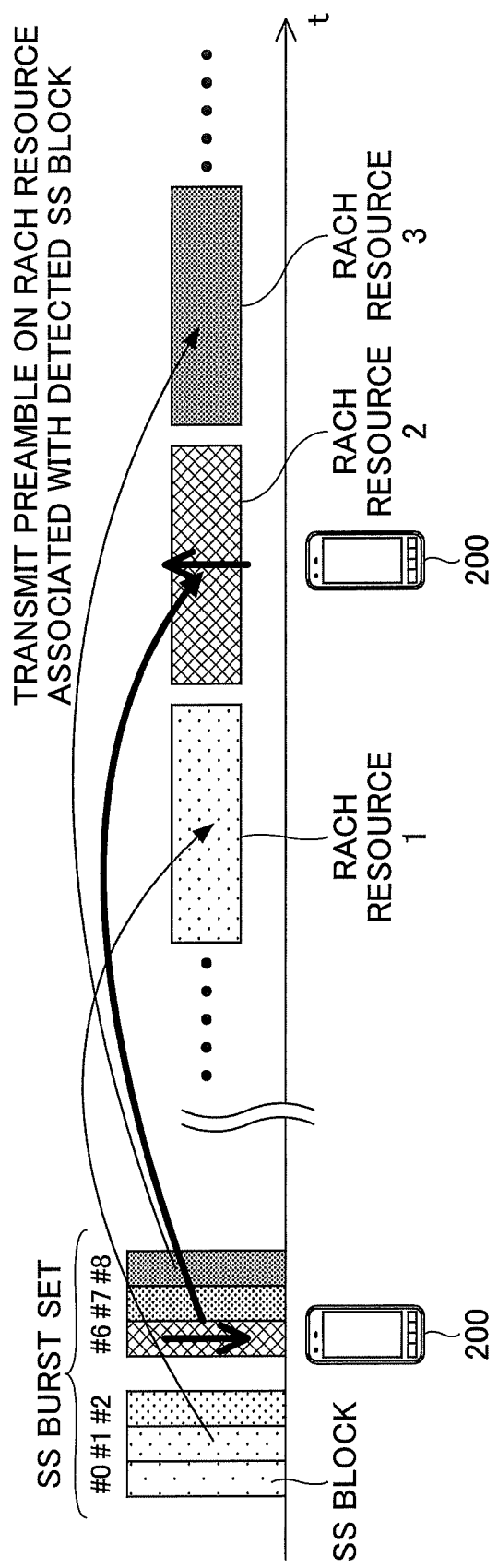
FIG. 2 is a diagram illustrating a correspondence between an SS block and a RACH resource.

FIG. 2 is a diagram illustrating a correspondence between an SS block and a RACH resource. The user equipment 200 can determine resources (a RACH resource 1, a RACH resource 2, a RACH resource 3, . . . ) available for transmission of a preamble based on a RACH Configuration. For example, a mapping rule defining a correspondence between an SS block in an SS burst set and a RACH resource may be provided by the base station 100 to the user equipment 200 via broadcast information or the like, or may be defined in advance in the specification. The mapping rule can be arbitrarily defined. For example, as shown in FIG. 2, the mapping rule may be defined such that a preamble for an SS block #1 is transmitted on the RACH resource 1, a preamble for an SS block #6 is transmitted on the RACH resource 2, and so on.

The user equipment 200 selects a RACH resource associated with an SS block in which a PSS, an SSS, or a PBCH is placed and transmits a preamble to the base station 100. For example, when the user equipment 200 can detect a PSS, an SSS, or a PBCH in the SS block #6, the user equipment 200 selects the RACH resource 2 associated with the SS block #6. Then, the user equipment 200 selects, from a plurality of preambles available for the selected RACH resource 2, a preamble and transmits the preamble to the base station 100.

It should be noted that a plurality of RACH resources (a plurality of time resources or a plurality of frequency resources) may be selected for one SS block or one RACH resource may be associated with a plurality of SS blocks. For example, seven, six, three, two RACH resources, one RACH resource, or the like in one slot may be selected for one SS block. For example, the user equipment 200 may randomly select one or more RACH resources from the selectable RACH resources to transmit a preamble.

The mapping rule is defined for mapping only from SS blocks actually transmitted from the base station 100 in the SS burst set or mapping from the maximum number L of SS blocks in the SS burst set. As used herein, an expression such as "all SS blocks in the SS burst set" means "all SS blocks actually transmitted from the base station 100 in the SS burst set" if mapping is performed only from the SS blocks actually transmitted from the base station 100 in the SS burst set, or "all the L SS blocks in the SS burst set" if mapping is performed from the maximum number L of SS blocks in the SS burst set.

<Example of Mapping Period>

Figure 3:
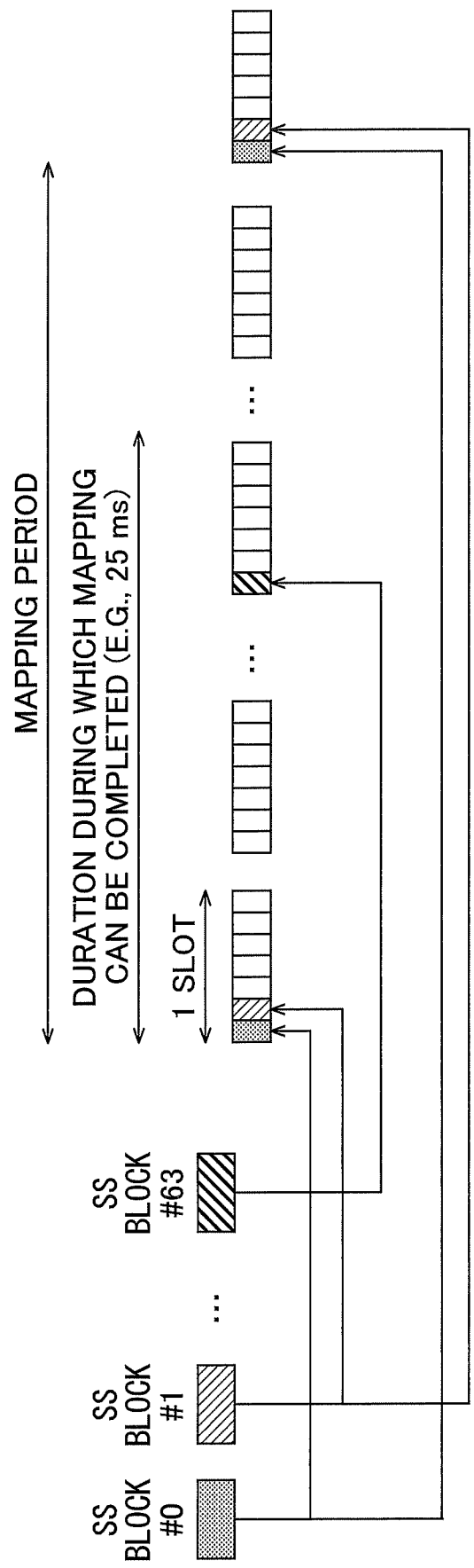
FIG. 3 is a diagram illustrating an example of determining a mapping period.

With reference to FIG. 3, an example of determining a period (hereinafter referred to as "a mapping period") of selecting a RACH resource according to an SS block based on a mapping rule will be described. FIG. 3 is a diagram illustrating an example of determining a mapping period.

As described above, a RACH resource arrangement is determined based on a RACH Configuration, and consequently, a period of the RACH resource arrangement is also determined based on the RACH Configuration (for example, the period of the RACH resource arrangement is equal to a period defined in the RACH Configuration Table).

For example, as RACH resources determined based on the RACH Configuration, it is assumed that one slot including RACH resources with 2.5 ms duration is defined, seven RACH resources are available for one slot, and a period of the RACH resource arrangement is 10 ms. In addition, it is assumed that possible values for a period of the SS burst set are 5 ms, 10 ms, 20 ms, 40 ms, 80 ms, and 160 ms, and that 20 ms is used for the period of the SS burst set among these possible values. It is further assumed that 64 SS blocks are transmitted in the SS burst set and one SS block is mapped to one RACH resource.

Mapping from an SS block to a RACH resource is determined based on a mapping rule. In this example, a duration during which mapping from all SS blocks in the SS burst set to RACH resources can be completed is ten slots (25 ms). By determining a mapping period as 40 ms based on the period (20 ms) of the SS burst set, the period (10 ms) of the RACH resource arrangement, a multiple thereof, or the like, a RACH resource corresponding to an SS block #0 can be always located in the first RACH resource in the mapping period (40 ms). Thus, based on a RACH resource on which a preamble is received, the base station 100 can easily identify which of the SS blocks can be detected by the user equipment 200.

On the other hand, when the mapping period is determined as 20 ms in the example illustrated in FIG. 3, it is not possible to map all SS blocks to RACH resources within 20 ms. Thus, it is preferable that the mapping period be a value larger than or equal to a duration during which mapping from all SS blocks in the SS burst set can be completed.

Thus, in an embodiment of the present invention, the mapping period is determined as follows based on the period of the SS burst set or the period of the RACH resource arrangement.

(1) The mapping period is determined as a minimum value, among possible values for the period of the SS burst set, which is larger than a duration during which mapping from all SS blocks in the SS burst set can be completed. In the example described with reference to FIG. 3, the possible values for the period of the SS burst set are 5 ms, 10 ms, 20 ms, 40 ms, 80 ms, and 160 ms, and the duration during which mapping from all SS blocks in the SS burst set can be completed is 25 ms. In this example, the mapping period is determined as 40 ms.

(2) The mapping period is determined as a minimum value, among multiples of the period of the SS burst set provided by the base station to the user equipment, which is larger than a duration during which mapping from all SS blocks in the SS burst set can be completed. In the example described with reference to FIG. 3, the period of the SS burst set provided by the base station to the user equipment is 20 ms, and the duration during which mapping from all SS blocks in the SS burst set can be completed is 25 ms. In this example, the mapping period is determined as 40 ms.

(3) The mapping period is determined as the period of the SS burst set provided by the base station to the user equipment. In the example described with reference to FIG. 3, the period of the SS burst set provided by the base station to the user equipment is 20 ms. Considering a duration during which mapping from all SS blocks in the SS burst set can be completed, the base station may change the period of the SS burst set from 20 ms to 40 ms and provide the period 40 ms of the SS burst set to the user equipment.

(4) The mapping period is determined as a minimum value, among multiples of the period of the RACH resource arrangement, which is larger than a duration during which mapping from all SS blocks in the SS burst set can be completed. In the example described with reference to FIG. 3, the period of the RACH resource arrangement is 10 ms, and the duration during which mapping from all SS blocks in the SS burst set can be completed is 25 ms. In this example, the mapping period is determined as 30 ms.

(5) The mapping period is determined as the period of the RACH resource arrangement. In the example described with reference to FIG. 3, the period of the RACH resource arrangement is 10 ms and the duration during which mapping from all SS blocks in the SS burst set can be completed is 25 ms. In order that mapping from all SS blocks in the SS burst set can be completed in the mapping period, the base station may provide a RACH Configuration to the user equipment such that mapping from all SS blocks in the SS burst set can be completed in 10 ms (the period of the RACH resource period).

It should be noted that any combination of (1)-(5) may be used. When a combination of them is used, which of (1)-(5) is used may be provided by the base station to the user equipment via broadcast information, radio resource control (RRC) signaling, downlink control information (DCI), or the like, or may be defined in advance in the specification. Alternatively, when a combination of them is used, a larger value or a smaller value may be used. For example, when a combination of the mapping period determined in (2) and the mapping period determined in (4) is used, a larger value or a smaller value of the two may be determined as the mapping period.

Alternatively, the mapping period may be determined by the base station or a network node rather than the user equipment, and provided to the user equipment via broadcast information, RRC signaling, DCI, or the like. Alternatively, possible values for the mapping period may be defined in the specification. For example, the mapping period may be determined for each index in the RACH Configuration Table.

Example 1

Figure 4:
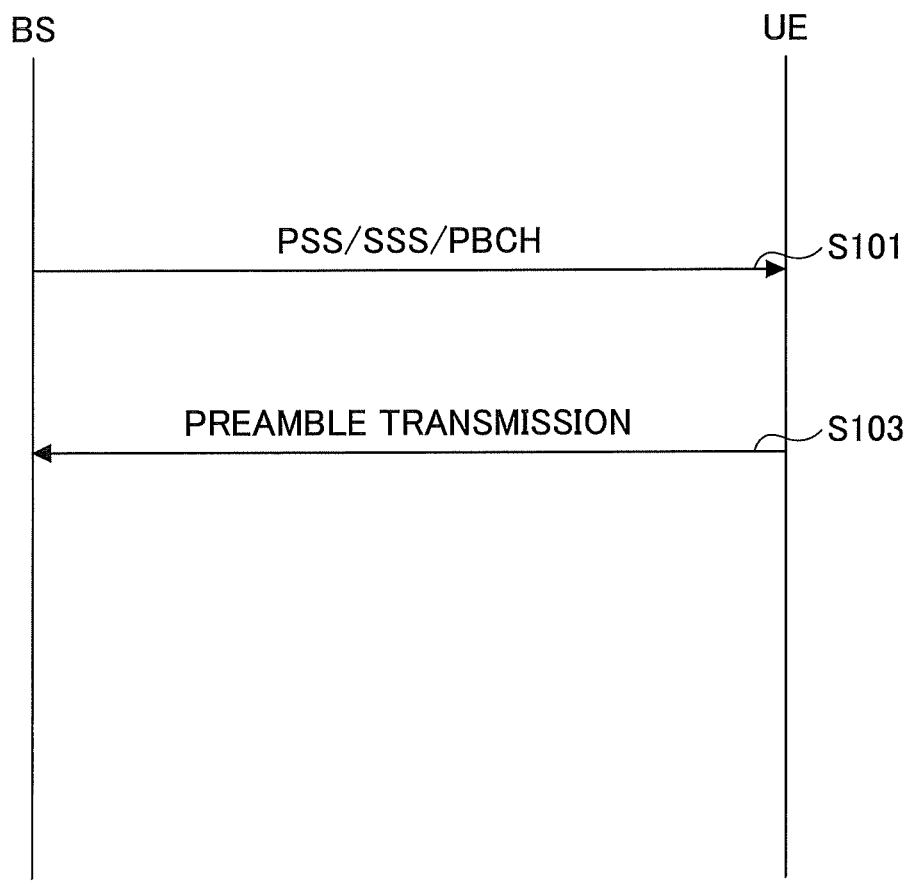
FIG. 4 is a sequence diagram illustrating a preamble transmission procedure in a radio communication system according to an embodiment of the present invention.
Figure 5:
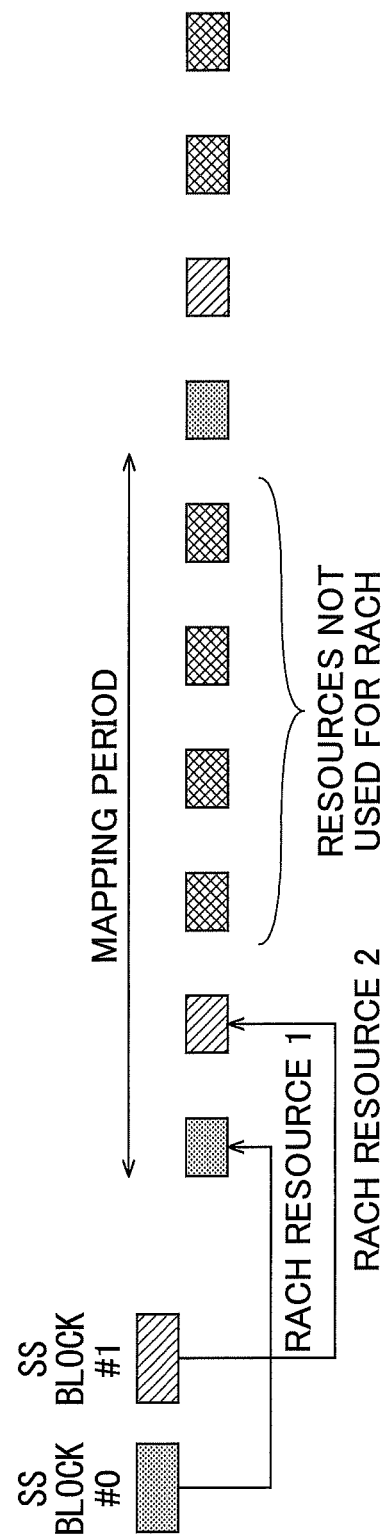
FIG. 5 is a diagram illustrating an example 1 of selecting a RACH resource for transmitting a preamble.

Next, with reference to FIGS. 4 and 5, an example 1 of a preamble transmission procedure in a radio communication system according to the embodiment will be described in detail. FIG. 4 is a sequence diagram illustrating the preamble transmission procedure in the radio communication system according to the embodiment. FIG. 5 is a diagram illustrating the example 1 of selecting a resource for transmitting a preamble.

The base station 100 transmits a PSS, an SSS, and a PBCH to the user equipment 200 (S101). The PSS is used for time synchronization, frequency synchronization, detection of part of a cell ID, and so on, the SSS is used for detection of the cell ID and so on, and the PBCH includes part of system information required for initial access. The PSS, the SSS, and/or the PBCH are placed in a resource referred to as an SS block in an SS burst set, and transmitted to the user equipment 200. The user equipment 200 attempts to detect the PSS, the SSS, and the PBCH in the SS burst set. When the user equipment 200 can detect the PSS, the SSS, and the PBCH, the user equipment 200 can receive other system information transmitted on a physical downlink shared channel (PDSCH), for example. In this example, system information transmitted on the PBCH and system information transmitted on another channel such as the PDSCH are collectively referred to as broadcast information.

The broadcast information provided to the user equipment 200 may include a RACH Configuration (for example, an index in a RACH Configuration Table), a mapping rule defining a correspondence between an SS block in an SS burst set and a RACH resource, a mapping period, and so on. In the embodiment, it is assumed that these pieces of information are included in the broadcast information. However, any of these pieces of information may be provided to the user equipment 200 via control information (for example, RRC signaling, DCI, or the like) other than the broadcast information, or may be defined in advance in the specification.

The user equipment 200 determines resources available for transmission of a preamble based on the RACH Configuration included in the broadcast information. For example, as shown in FIG. 5, the user equipment 200 may determine, based on the RACH Configuration, that six resources in the time direction are available in one period (a period of a RACH resource arrangement) with a specified duration. The period of the RACH resource arrangement may be determined in consideration of the number of SS blocks in the SS burst set. For example, when the SS burst set includes eight SS blocks and one RACH resource in the time direction is used for one SS block, the period of the RACH resource arrangement is determined such that at least eight resources in the time direction are available in the period.

As described above, the mapping period from the SS blocks to the RACH resources may be determined based on the period of the SS burst set, the period of the RACH resource arrangement, or the like.

The user equipment 200 selects, from the resources available for transmission of the preamble, a RACH resource associated with the SS block in which the detected PSS, the detected SSS, or the detected PBCH is placed using a mapping rule defining a correspondence between an SS block in an SS burst set and a RACH resource. For example, as shown in FIG. 5, the mapping rule defines that a preamble for an SS block #0 is transmitted on a RACH resource 1, a preamble for an SS block #1 is transmitted on a RACH resource 2, and so on. Using this mapping rule, when the user equipment 200 can detect the PSS, the SSS, or the PBCH in the SS block #0, the user equipment 200 selects the RACH resource 1. When the user equipment 200 can detect the PSS, the SSS, or the PBCH in the SS block #1, the user equipment 200 selects the RACH resource 2. The locations of the RACH resource 1 and the RACH resource 2 can be arbitrarily configured. For example, the RACH resource 1 and the RACH resource 2 may be frequency-multiplexed at the same timing.

It should be noted that all of the resources in one period of the RACH resource arrangement may not be necessarily used for RACH. For example, when mapping is performed only from SS blocks actually transmitted from the base station in the SS burst set and when only the SS block #0 and the SS block #1 in the SS burst set are actually transmitted as shown in FIG. 5, resources other than the RACH resource 1 and RACH resource 2 may not be used for RACH. In other words, RACH resources remaining after mapping only from SS blocks actually transmitted from the base station in the SS burst set may not be mapped from the SS blocks. Alternatively, for example, when mapping is performed from the maximum number L of SS blocks in the SS burst set and when L is equal to 4 and only the SS block #1 is actually used for transmission among the SS blocks #0-#3, RACH resources to be mapped from the SS blocks #0, #2, and #3 may not be used for RACH. Further, RACH resources remaining after mapping from the maximum number L of SS blocks in the SS burst set may not be mapped from the SS blocks. The RACH resources in which mapping from the SS blocks #0-#3 is not performed may not be used for RACH. In any of these cases, the resources which are not used for RACH may be used for another purpose such as transmission of another channel (for example, a data channel or a control channel).

In FIG. 5, although RACH resources are selected from the beginning of the resources in one period of the RACH resource arrangement, RACH resources may be selected from the end of the resources or may be selected based on another rule.

Further, RACH resources may not be fully used in the last slot in which mapping from the SS block is performed. For example, in the last slot in which mapping from the SS block #63 is performed in FIG. 3, only one RACH resource is used. In this example, a RACH resource may be selected from the beginning of the resources in the slot, may be selected from the end of the resources in the slot, or may be selected based on another rule. Similarly, when RACH resources are frequency-multiplexed and the RACH resources may not be fully used, a RACH resource may be selected from a higher frequency, may be selected from a lower frequency, or may be selected based on another rule.

The user equipment 200 transmits a preamble to the base station 100 on the selected resource (S103). When the base station 100 receives the preamble, the base station 100 can identify, based on the resource on which the preamble is received and the same mapping rule as that of the user equipment 200, which of the SS blocks can be detected by the user equipment 200. The base station 100 transmits an RAR to the user equipment 200 in response to the received preamble. Then, a connection is established between the base station 100 and the user equipment 200.

Example 2

Figure 6:
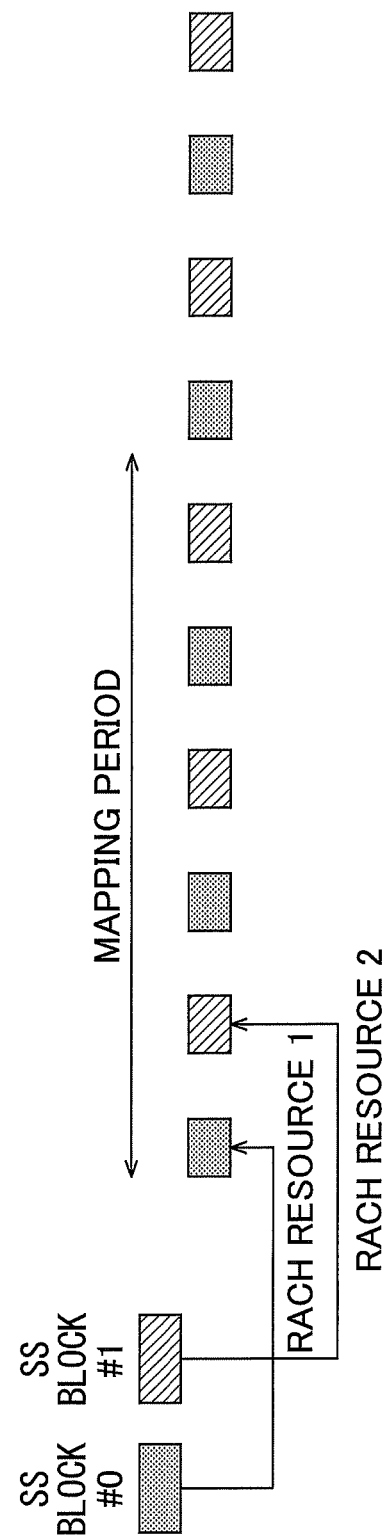
FIG. 6 is a diagram illustrating an example 2 of selecting a RACH resource for transmitting a preamble.

Next, with reference to FIG. 6, an example 2 of a preamble transmission procedure in a radio communication system according to the embodiment will be described in detail. FIG. 6 is a diagram illustrating the example 2 of selecting a resource for transmitting a preamble. In the example 2, a preamble is transmitted according to the preamble transmission procedure shown in FIG. 4. In the following, differences from the example 1 will be described in detail.

In step S101, the user equipment 200 determines resources available for transmission of a preamble based on the RACH Configuration included in the broadcast information. For example, as shown in FIG. 6, the user equipment 200 may determine, based on the RACH Configuration, that six RACH resources in the time direction are available in one period (a period of a RACH resource arrangement) with a specified duration.

The user equipment 200 selects, from the resources available for transmission of the preamble, a RACH resource associated with the SS block in which the detected PSS, the detected SSS, or the detected PBCH is placed using a mapping rule defining a correspondence between an SS block in an SS burst set and a RACH resource. For example, as shown in FIG. 6, the mapping rule defines that a preamble for an SS block #0 is transmitted on a RACH resource 1, a preamble for an SS block #1 is transmitted on a RACH resource 2, and so on. Further, when the mapping period is twice or more as long as a duration during which mapping from all SS blocks in the SS burst set can be completed, mapping from the SS block #0 and the SS block #1 may be repeated in the remaining RACH resources. In the example shown in FIG. 6, mapping from the SS block #0 and the SS block #1 are repeated three times in one mapping period. The number of repetitions may be defined in advance in the specification or may be provided by the base station. Alternatively, mapping may be repeated as long as mapping from all SS blocks in the SS burst set in one period can be performed. RACH resources remaining after mapping as described above may not be used for RACH. The resources which are not used for RACH may be used for another purpose such as transmission of another channel (for example, a data channel or a control channel).

In step S103, the user equipment 200 transmits a preamble to the base station 100 on the selected resource.

Example 3

Figure 7:
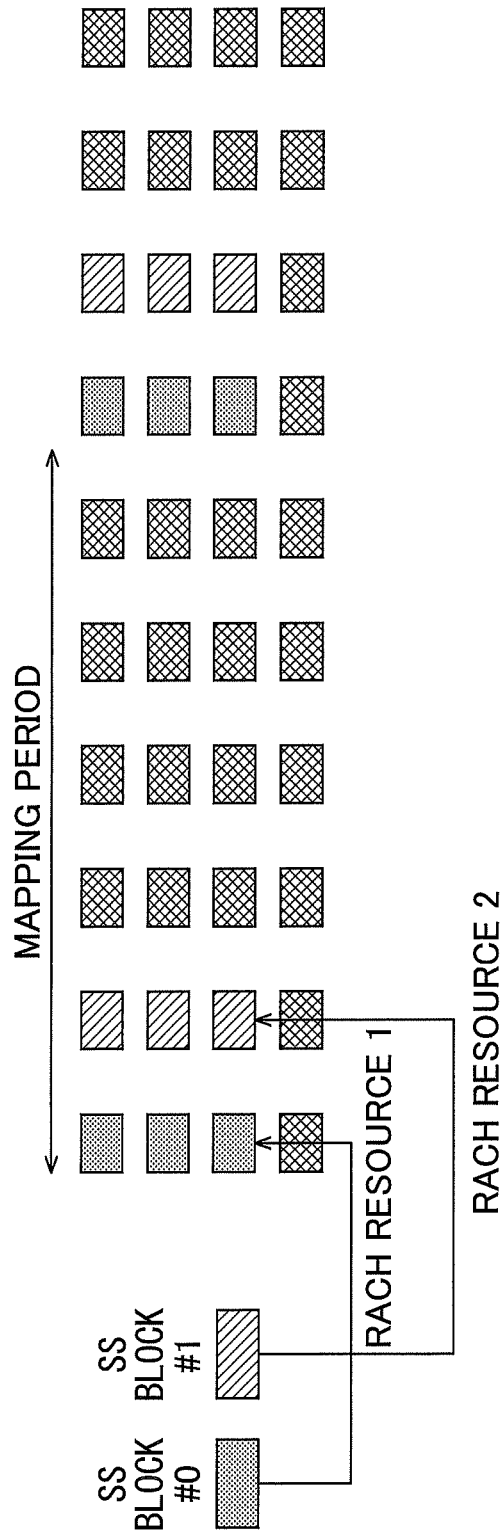
FIG. 7 is a diagram illustrating an example 3 of selecting a RACH resource for transmitting a preamble.

Next, with reference to FIG. 7, an example 3 of a preamble transmission procedure in a radio communication system according to the embodiment will be described in detail. FIG. 7 is a diagram illustrating the example 3 of selecting a resource for transmitting a preamble. In the example 3, a preamble is transmitted according to the preamble transmission procedure shown in FIG. 4. In the following, differences from the example 1 will be described in detail.

In step S101, the user equipment 200 determines resources available for transmission of a preamble based on the RACH Configuration included in the broadcast information. For example, as shown in FIG. 7, the user equipment 200 may determine, based on the RACH Configuration, that six RACH resources in the time direction and four RACH resources in the frequency direction are available in one period (a period of a RACH resource arrangement) with a specified duration. In other words, four RACH resources are frequency-multiplexed at the same timing.

The user equipment 200 selects, from the resources available for transmission of the preamble, a RACH resource associated with the SS block in which the detected PSS, the detected SSS, or the detected PBCH is placed using a mapping rule defining a correspondence between an SS block in an SS burst set and a RACH resource. When three RACH resources are needed for one SS block, a preamble for the SS block #0 is transmitted in the first time resource (the RACH resource 1). Since there are not enough remaining resources in the first time resource to transmit a preamble for the SS block #1, the remaining one RACH resource is not used for the SS block #1 and the second RACH resource 2 as a next time resource is selected.

In step S103, the user equipment 200 transmits a preamble to the base station 100 on the selected resource.

<Functional Configuration of Base Station>

Figure 8:
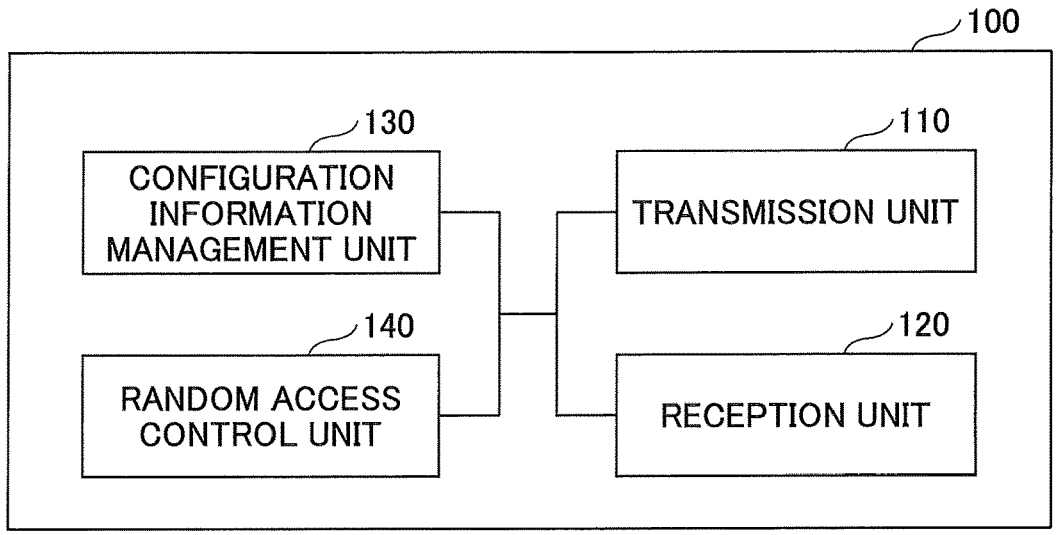
FIG. 8 is a block diagram illustrating an example of a functional configuration of a base station.

FIG. 8 is a block diagram illustrating an exemplary functional configuration of a base station 100. The base station 100 includes a transmission unit 110, a reception unit 120, a configuration information management unit 130, and a random access control unit 140. The functional configuration illustrated in FIG. 8 is merely an example. The functional division and names of the functional units are not limited to the example illustrated in FIG. 8 as long as the operations according to the embodiment can be performed.

The transmission unit 110 is configured to generate a lower-layer signal from higher-layer information and wirelessly transmit the signal. The transmission unit 110 transmits signals such as a PSS, an SSS, and a PBCH. The reception unit 120 is configured to wirelessly receive various signals and obtain higher-layer information from the received signals.

The configuration information management unit 130 stores predefined configuration information. The configuration information management unit 130 also determines configuration information (for example, a RACH Configuration, a mapping rule, a mapping period, or any configuration used in the embodiment) to be provided to the user equipment 200 and stores the configuration information. The configuration information management unit 130 sends to the transmission unit 110 the configuration information to be provided to the user equipment 200 to cause the transmission unit 110 to transmit the configuration information.

The random access control unit 140 manages a random access procedure for the user equipment 200. When the random access control unit 140 receives a preamble from the user equipment 200, the random access control unit 140 causes the transmission unit 110 to transmit an RAR. When the random access control unit 140 receives an RRC Connection Request from the user equipment 200, the random access control unit 140 causes the transmission unit 110 to transmit an RRC Connection Setup.

<Functional Configuration of User Equipment>

Figure 9:
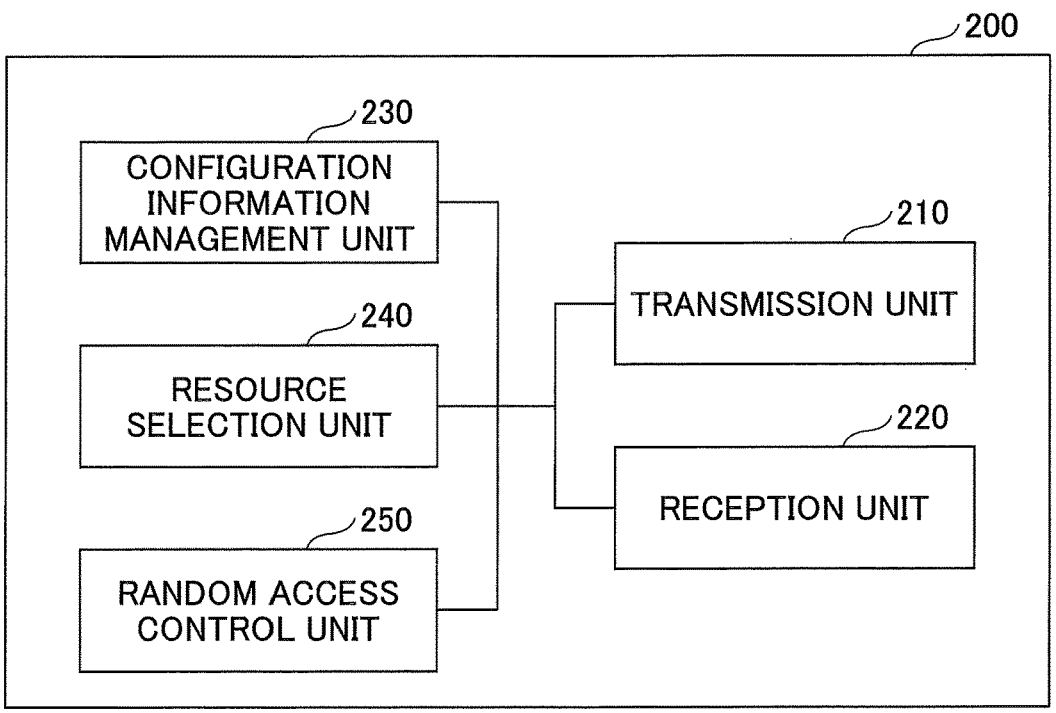
FIG. 9 is a block diagram illustrating an example of a functional configuration of user equipment.

FIG. 9 is a block diagram illustrating an exemplary functional configuration of user equipment 200. The user equipment 200 includes a transmission unit 210, a reception unit 220, a configuration information management unit 230, a resource selection unit 240, and a random access control unit 250. The functional configuration illustrated in FIG. 9 is merely an example. The functional division and names of the functional units are not limited to the example illustrated in FIG. 9 as long as the operations according to the embodiment can be performed.

The transmission unit 210 is configured to generate a lower-layer signal from higher-layer information and wirelessly transmit the signal. The transmission unit 210 transmits a preamble based on configuration information stored in the configuration information management unit 230 as described below. The reception unit 220 is configured to wirelessly receive various signals and obtain higher-layer information from the received signals. The reception unit 220 receives signals such as a PSS, an SSS, and a PBCH from the base station 100. The reception unit 220 also receives configuration information (for example, a RACH Configuration, a mapping rule, a mapping period, or any configuration used in the embodiment) from the base station 100 or the like.

The configuration information management unit 230 stores predefined configuration information and the configuration information provided from the base station 100 or the like. The configuration information which can be managed by the configuration management unit 230 includes not only the configuration information provided from the base station 100 or the like but also configuration information defined in advance in the specification.

The resource selection unit 240 determines resources available for transmission of the preamble based on the configuration information stored in the configuration information management unit 230. Further, the resource management unit 240 selects, from the resources available for transmission of the preamble, a RACH resource for transmitting the preamble based on the mapping rule stored in the configuration information management unit 230.

The random access control unit 250 manages a random access procedure for the base station 100. When the user equipment 200 establishes a connection to the base station 100 or re-synchronizes with the base station 100 for originating a call, for handover, or the like, the random access control unit 250 causes the transmission unit 210 to transmit a preamble randomly selected from a plurality of preambles. Further, when the preamble is transmitted but the random access control unit 250 does not receive an RAR that is a response to the preamble within a period called an RAR window, for example, the random access control unit 250 causes the transmission unit 210 to retransmit the preamble. When the random access control unit 250 receives an RAR from the base station 100, the random access control unit 250 causes the transmission unit 210 to transmit an RRC Connection Request.

<Hardware Configuration>

The block diagrams used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 10:
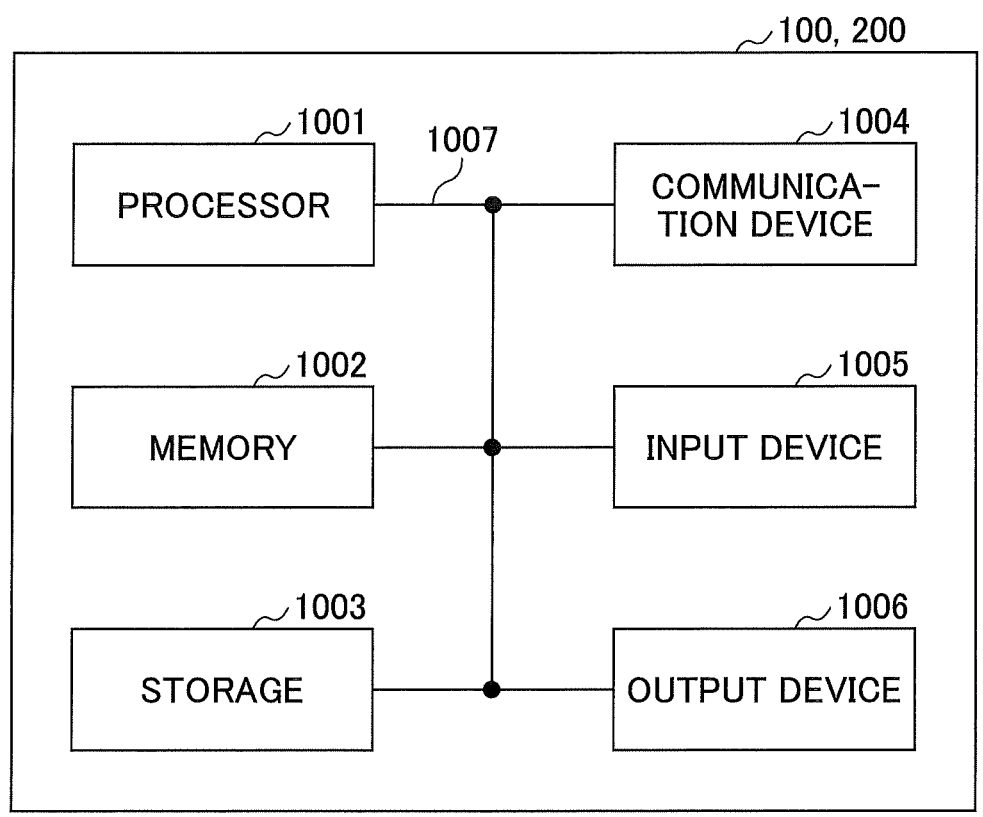
FIG. 10 is a diagram illustrating an example of a hardware configuration of a radio communication apparatus according to an embodiment of the present invention.

For example, the base station, the user equipment, or the like according to the embodiment of the invention may function as a computer that performs a preamble transmission method according to this embodiment. FIG. 10 is a diagram illustrating an example of a hardware configuration of a radio communication apparatus such as the base station 100 or the user equipment 200 according to this embodiment. Each of the base station 100 and the user equipment 200 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 100 or the user equipment 200 may include one or a plurality of devices illustrated in FIG. 10 or may not include some of the devices.

Each function of the base station 100 and the user equipment 200 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, the transmission unit 110, the reception unit 120, the configuration information management unit 130, and the random access control unit 140 in the base station 100, as well as the transmission unit 210, the reception unit 220, the configuration information management unit 230, the resource selection unit 240, and the random access control unit 250 in the user equipment 200 may be implemented in the processor 1001.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the transmission unit 110, the reception unit 120, the configuration information management unit 130, and the random access control unit 140 in the base station 100, as well as the transmission unit 210, the reception unit 220, the configuration information management unit 230, the resource selection unit 240, and the random access control unit 250 in the user equipment 200 may be implemented by a control program that is stored in the memory 1002 and is executed by the processor 1001. The other functional blocks may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform a preamble transmission method according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the transmission unit 110, the reception unit 120, the transmission unit 210, the reception unit 220, and the like may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and/or the memory 1002 are connected to each other via the bus 1007 for information communication. The bus 1007 may be a single bus or the devices may be connected to each other by different buses.

Each of the base station 100 and the user equipment 200 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

Summary of Embodiments

As described above, in an embodiment of the present invention, there is provision for user equipment including:

a reception unit configured to detect a synchronization signal or a physical broadcast channel from a base station;

a resource selection unit configured to select, from resources determined based on configuration information for preamble transmission, a resource for transmitting a preamble according to the detected synchronization signal or the detected physical broadcast channel based on a mapping rule, with a period determined based on at least one of a period of a synchronization signal burst set that is a duration during which the synchronization signal or the physical broadcast channel can be transmitted and a period of a resource available for transmission of the preamble;

a transmission unit configured to transmit the preamble to the base station on the selected resource.

Since a predefined relationship is established between a period of an SS burst set or a period of a RACH resource arrangement and a mapping period from SS blocks to RACH resources in order for the user equipment 200 to transmit a preamble, the base station 100 can identify, based on a resource on which the preamble is received, which of the SS blocks can be detected by the user equipment 200.

The period of mapping from the synchronization signal or the physical broadcast channel to the resource based on the mapping rule may be a value, among at least one of the period of the synchronization signal burst set or a multiple of the period and the period of the resource available for transmission of the preamble or a multiple of the period, that is larger than or equal to a duration during which mapping in the synchronization signal burst set can be completed.

By using the mapping period as determined above, all SS blocks can be mapped to the RACH resources in the mapping period.

After mapping from the synchronization signal or the physical broadcast channel in the synchronization signal burst set based on the mapping rule, a resource which is not mapped among the resources determined based on the configuration information for preamble transmission may not be used for transmission of the preamble; or when the synchronization signal or the physical broadcast channel is not transmitted in the synchronization signal burst set, a resource corresponding to the non-transmitted synchronization signal or the non-transmitted physical broadcast channel may not be used for transmission of the preamble.

While the RACH resource arrangement is determined based on a RACH Configuration, all SS blocks in the SS burst set may not be necessarily used. By using resources which are not used for RACH for another purpose, the resources can be efficiently used.

When the period of mapping from the synchronization signal or the physical broadcast channel to the resource based on the mapping rule is twice or more as long as a duration during which mapping in the synchronization signal burst set can be completed, the resource selection unit may repeat mapping from the synchronization signal or the physical broadcast channel to the resource in the period of mapping.

Transmitting the preamble multiple times can increase a probability that the base station can receive the preamble.

When the resources determined based on the configuration information for preamble transmission are frequency-multiplexed at a same timing, and in a first time of a resource in which mapping from a first synchronization signal or a first physical broadcast channel in the synchronization burst set is performed, remaining resources are insufficient for mapping from a second synchronization signal or a second physical broadcast channel in the synchronization burst set, the resource selection unit may select a resource for mapping from the second synchronization signal or the second physical broadcast channel in a second time other than the first time.

When there are not enough remaining resources in the frequency direction at the same timing, using a next time resource can eliminate a need to switch a frequency region of a RACH resource with respect to a single SS block.

<Supplementary Explanation>

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other suitable systems and/or next-generation systems that have functionality enhanced based on these systems.

The terms "system" and "network" used in the specification are interchangeably used.

In the specification, a specific operation performed by the base station may be performed by an upper node of the base station. In a network having one or a plurality of network nodes including the base station, it is clearly understood that various operations performed for communication with the user equipment can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Determination may be made based on a value (0 or 1) represented by 1 bit, may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

The terms "include" and "including" and the modifications thereof are intended to be inclusive, similarly to the term "comprising", as long as they are used in the specification or the claims. In addition, the term "or" used in the specification or the claims does not mean exclusive OR.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

DESCRIPTION OF NOTATIONS 100 base station
110 transmission unit
120 reception unit
130 configuration information management unit
140 random access control unit
200 user equipment
210 transmission unit
220 reception unit
230 configuration information management unit
240 resource selection unit
250 random access control unit

The invention claimed is:

1. A terminal comprising:
a receiver that receives a synchronization signal and a broadcast channel in a synchronization signal block set from a base station;
a processor that selects a resource for transmitting a preamble from random access channel resources according to the received synchronization signal and the received broadcast channel; and
a transmitter that transmits the preamble on the selected resource to the base station;
wherein the processor uses, as a mapping period for mapping the synchronization signal and the broadcast channel to the random access channel resources, a duration in which a process of mapping synchronization signals and broadcast channels transmitted from the base station in the synchronization signal block set to the random access channel resources can be completed, the duration being a value that is based on a multiple of a period of arranging the random access channel resources determined based on configuration information regarding a random access channel.

2. The terminal as claimed in claim 1, wherein the processor selects resources for transmitting a plurality of preambles according to the received synchronization signal and the received broadcast channel in the mapping period.

3. The terminal as claimed in claim 2, wherein when an unmapped random access channel resource exists in the mapping period after selecting the resource for transmitting the preamble according to the received synchronization signal and the received broadcast channel, the processor does not transmit a preamble in the unmapped random access channel resource.

4. The terminal as claimed in claim 2, wherein the processor uses, as the mapping period, a duration in which the process of mapping the synchronization signals and the broadcast channels transmitted from the base station in the synchronization signal block set to the random access channel resources can be completed, the duration being an intersection of the value that is based on the multiple of the period of arranging the random access channel resources and possible values for a period of the synchronization signal block set.

5. The terminal as claimed in claim 2, wherein the mapping period is a minimum duration in which the process of mapping the synchronization signals and the broadcast channels transmitted from the base station in the synchronization signal block set to the random access channel resources can be completed, the minimum duration being a value that is based on the multiple of the period of arranging the random access channel resources.

6. The terminal as claimed in claim 1, wherein when an unmapped random access channel resource exists in the mapping period after selecting the resource for transmitting the preamble according to the received synchronization signal and the received broadcast channel, the processor does not transmit a preamble in the unmapped random access channel resource.

7. The terminal as claimed in claim 6, wherein the processor uses, as the mapping period, a duration in which the process of mapping the synchronization signals and the broadcast channels transmitted from the base station in the synchronization signal block set to the random access channel resources can be completed, the duration being an intersection of the value that is based on the multiple of the period of arranging the random access channel resources and possible values for a period of the synchronization signal block set.

8. The terminal as claimed in claim 6, wherein the mapping period is a minimum duration in which the process of mapping the synchronization signals and the broadcast channels transmitted from the base station in the synchronization signal block set to the random access channel resources can be completed, the minimum duration being a value that is based on the multiple of the period of arranging the random access channel resources.

9. The terminal as claimed in claim 1, wherein the processor uses, as the mapping period, a duration in which the process of mapping the synchronization signals and the broadcast channels transmitted from the base station in the synchronization signal block set to the random access channel resources can be completed, the duration being an intersection of the value that is based on the multiple of the period of arranging the random access channel resources and possible values for a period of the synchronization signal block set.

10. The terminal as claimed in claim 9, wherein the mapping period is a minimum duration in which the process of mapping the synchronization signals and the broadcast channels transmitted from the base station in the synchronization signal block set to the random access channel resources can be completed, the minimum duration being a value that is based on the multiple of the period of arranging the random access channel resources.

11. The terminal as claimed in claim 1, wherein the mapping period is a minimum duration in which the process of mapping the synchronization signals and the broadcast channels transmitted from the base station in the synchronization signal block set to the random access channel resources can be completed, the minimum duration being a value that is based on the multiple of the period of arranging the random access channel resources.

12. A preamble transmission method, comprising the steps of:
receiving a synchronization signal and a broadcast channel in a synchronization signal block set from a base station;

selecting a resource for transmitting a preamble from random access channel resources according to the received synchronization signal and the received broadcast channel; and transmitting the preamble on the selected resource to the base station;

wherein a mapping period for mapping the synchronization signal and the broadcast channel to the random access channel resources is a duration in which a process of mapping synchronization signals and broadcast channels transmitted from the base station in the synchronization signal block set to the random access channel resources can be completed, the duration being a value that is based on a multiple of a period of arranging the random access channel resources determined based on configuration information regarding a random access channel.

13. A base station comprising:

a transmitter that transmits a synchronization signal and a broadcast channel in a synchronization signal block set; and a receiver that receives a preamble transmitted according to the synchronization signal and the broadcast channel on a resource selected from random access channel resources;

wherein a mapping period for mapping the synchronization signal and the broadcast channel to the random access channel resources is a duration in which a process of mapping synchronization signals and broadcast channels transmitted from the base station in the synchronization signal block set to the random access channel resources can be completed, the duration being a value that is based on a multiple of a period of arranging the random access channel resources determined based on configuration information regarding a random access channel.

14. A communication system comprising a terminal and a base station:

wherein the base station comprises:
a first transmitter that transmits a synchronization signal and a broadcast channel in a synchronization signal block set;

wherein the terminal comprises:
a receiver that receives the synchronization signal and the broadcast channel in the synchronization signal block set from the base station;
a processor that selects a resource for transmitting a preamble from random access channel resources according to the received synchronization signal and the received broadcast channel; and
a second transmitter that transmits the preamble on the selected resource to the base station;
wherein the processor uses, as a mapping period for mapping the synchronization signal and the broadcast channel to the random access channel resources, a duration in which a process of mapping synchronization signals and broadcast channels transmitted from the base station in the synchronization signal block set to the random access channel resources can be completed, the duration being a value that is based on a multiple of a period of arranging the random access channel resources determined based on configuration information regarding a random access channel.

* * * * *